United States Patent [19]

Valentino

[11] Patent Number: 5,914,824
[45] Date of Patent: Jun. 22, 1999

[54] REAR VIEW MIRROR APPARATUS AND METHOD FOR VEHICLE LANE CHANGING

[76] Inventor: Joseph A. Valentino, 1924 Parker Ave., Holmes, Pa. 19043

[21] Appl. No.: 08/887,268

[22] Filed: Jul. 2, 1997

[51] Int. Cl.$^6$ ........................................................ G02B 5/08
[52] U.S. Cl. ............................ 359/843; 359/872; 359/877
[58] Field of Search ..................... 359/843, 864, 359/872, 877; 307/10.1

[56] References Cited

U.S. PATENT DOCUMENTS

| | | |
|---|---|---|
| 3,166,630 | 1/1965 | Esslinger . |
| 3,208,343 | 9/1965 | Prochnow . |
| 3,469,901 | 9/1969 | Cook et al. . |
| 3,563,639 | 2/1971 | Bowler . |
| 3,575,496 | 4/1971 | Pollock et al. . |
| 3,749,480 | 7/1973 | DeWitt et al. . |
| 4,318,590 | 3/1982 | Hanley . |
| 4,609,265 | 9/1986 | McKee et al. . |
| 4,639,103 | 1/1987 | Hill . |
| 4,679,158 | 7/1987 | Tate . |
| 4,792,220 | 12/1988 | Janowicz . |
| 4,820,032 | 4/1989 | Thompson, Jr. . |
| 4,906,089 | 3/1990 | Biondi et al. . |
| 4,955,704 | 9/1990 | Janowicz . |
| 4,971,430 | 11/1990 | Lynas . |
| 5,035,496 | 7/1991 | An . |
| 5,056,905 | 10/1991 | Jensen . |
| 5,097,362 | 3/1992 | Lynas . |
| 5,126,885 | 6/1992 | Gray . |
| 5,132,851 | 7/1992 | Bomar et al. . |
| 5,159,497 | 10/1992 | Lynas . |
| 5,196,965 | 3/1993 | Lang et al. . |
| 5,479,297 | 12/1995 | Summers . |
| 5,566,028 | 10/1996 | Wodeslavsky . |
| 5,627,688 | 5/1997 | Valentino ................................. 359/843 |

FOREIGN PATENT DOCUMENTS

| | | |
|---|---|---|
| 0 094 817 | 5/1983 | European Pat. Off. . |
| 2 601 634 | 7/1986 | European Pat. Off. . |
| 61046738 | 7/1986 | European Pat. Off. . |
| 3805125 A1 | 8/1989 | Germany . |
| 4115474 A1 | 5/1991 | Germany . |
| 4115474 A1 | 11/1992 | Germany . |
| 4136601 A1 | 5/1993 | Germany . |
| WO 86/05451 | 9/1986 | WIPO . |
| WO 91/19626 | 12/1991 | WIPO . |
| WO 93/25410 | 12/1993 | WIPO . |

OTHER PUBLICATIONS

A Study of Commercial Motor Vehicle Electronics Based Rear and Side Object Detection Systems, DOT HS 808 080 (Jan. 1994).

*Primary Examiner*—Cassandra Spyrou
*Assistant Examiner*—Euncha Cherry
*Attorney, Agent, or Firm*—Finnegan, Henderson, Farabow, Garrett & Dunner, L.L.P.

[57] ABSTRACT

An apparatus and method in a tractor-trailer type vehicle for insuring the ability to change lanes without colliding with other vehicles traveling in lanes adjacent the lanes adjacent the lane in which the vehicle is traveling. The side rear view mirror is motorized to encompass fields of view that include both adjacent and non-adjacent lanes without attention on the part of the operator. The mirror is rotated at a minimum rate of speed to prevent confusion on the part of the operator during travel of the mirror between the two positions. The normal home position setpoint and the outer or scanned position setpoint are adjustable. The activation switch may be on the gear shift lever, the turn signal, or the control box for the motor.

23 Claims, 6 Drawing Sheets

REAR VIEW MIRROR APPARATUS AND METHOD FOR VEHICLE LANE CHANGING

BACKGROUND OF INVENTION

1. Field of Invention

The present invention relates to a vehicle rear view mirror system, and more particularly to motorized rear view mirror apparatus and method. Although the system is useful for all types of vehicles, it is particularly suited for large trucks and busses, and is described in that connection.

2. Description of Related Art

Trucks and busses are being made longer and longer, which presents problems associated with visibility, particularly rear view visibility along both the right and left side of the bus or truck body. As the body becomes longer, the field of view along opposite sides of the truck or bus body becomes more narrow.

At the same time highways are being built with a greater number of lanes, with the result that the percentage of the roadway width, or in other words, the percentage of the total number of lanes of the highway that can be viewed with a rear view mirror is becoming less.

It is commonplace, for example, to provide power operated mirrors, where the view is changed by adjusting the position of the mirror relative to the driver. This is typically accomplished by trial and error; and usually implemented before a driver gets underway, or when stopped at a stop sign or red light. It would seem that the area of visibility of the operator could be greatly improved by moving the mirror. However, to view an area while it is changing, at times is confusing to the driver, even to the extent that the panning can sometimes cause an accident rather than prevent one.

Various other solutions have been proposed for increasing the visibility of the roadway both directly behind the truck or bus and along opposite sides, such as altering the contour of the rear view mirrors to control the area or magnification; or by the use of periscope type devices, or television cameras placed at strategic locations on the truck with monitors located in the cab. All of these proposed solutions either leave much to be desired in the area of equipment reliability, or are prohibitively expensive. Without this sophisticated equipment, one of the most dangerous maneuvers in driving busses and trucks is changing lanes on a multilane highway.

In light of the foregoing there is a need for a rear view apparatus and method for trucks and busses that reassure drivers of the ability to change lanes in multilane highways without danger of colliding with other vehicles.

SUMMARY OF THE INVENTION

Accordingly, the invention is directed to a rear view mirror apparatus and method of operation for trucks and busses that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof as well as the appended drawings.

To achieve these and other advantages, and in accordance with the purpose of the invention as embodied and broadly described, the invention is an apparatus for viewing an area of a roadway rearwardly and to one side of a motor vehicle prior to changing lanes in the roadway, comprising at least one rotatably mounted mirror having a reflective surface in a field of view of the vehicle operator. The mirror is normally oriented in a home setpoint position to permit the operator at all times to view a roadway lane adjacent the lane on which the vehicle is traveling. A motor coupled to the mirror is operative when activated to rotate the mirror between a home setpoint position and a scanning setpoint position at a rate of speed sufficient to render transparent any view intermediate the home setpoint and scanning setpoint position of the mirror and permit the operator to view the roadway corresponding to the scanning setpoint position. The scanning setpoint position includes a lane of the roadway outwardly spaced from the adjacent lane. A motor activation switch and a motor controller, responsive to the manual operation of the activation switch to one position, rotate the mirror from the home setpoint position to the scanning setpoint position, and are responsive to the release of the switch to a second position for returning the mirror from the scanning setpoint position to the home setpoint position.

In another aspect, the invention is a method for viewing an area of a roadway rearwardly and to one side of a truck body prior to changing lanes in the roadway. The method comprises rotating the mirror between a home setpoint position and a scanning setpoint position at a rate of speed sufficient to render transparent any view intermediate the home setpoint and scanning setpoint positions of the mirror and permit the operator to view the roadway corresponding to the scanning setpoint position in response to the operation of a motor activation switch to a first position. The scanning setpoint position includes a lane of the roadway outwardly spaced from the adjacent lane. The method further includes maintaining the mirror in the scanning setpoint position while the motor activation switch is in said first position, and rotating the mirror from the scanning setpoint position to the home setpoint position upon release of the motor activation switch.

It is to be understood that both the foregoing general description and the following detailed description are exemplary and explanatory and are intended to provide further explanation of the invention as claimed.

BRIEF DESCRIPTION OF THE DRAWINGS

The accompanying drawings are include to provide a further understanding of the invention and are incorporated in and constitute a part of this specification, illustrate one embodiment of the invention, and together with the description serve to explain the principles of the invention.

DESCRIPTION OF PREFERRED EMBODIMENT

In accordance with the present invention, an apparatus for viewing an area of a roadway rearwardly and to the side of a body of a truck or bus prior to changing lanes or direction in the roadway includes at least one rotatably mounted motorized minor having a reflective surface in a field of view of the vehicle operator. The mirror is normally oriented in a home setpoint position to permit the operator to view a roadway lane adjacent the lane on which the vehicle is traveling. This narrow view, especially as the vehicles get longer, causes the drivers to be unsure of their ability to change lanes without colliding with other vehicles. The present invention significantly reduces this problem.

The problem solved by the present invention is not confined to articulated trucks or cargo carriers, but extends to passenger buses that have one or more articulated joints either behind a tractor portion of the vehicle or behind a passenger section that commences twenty or thirty feet from the tractor section, for example.

Figure 1:
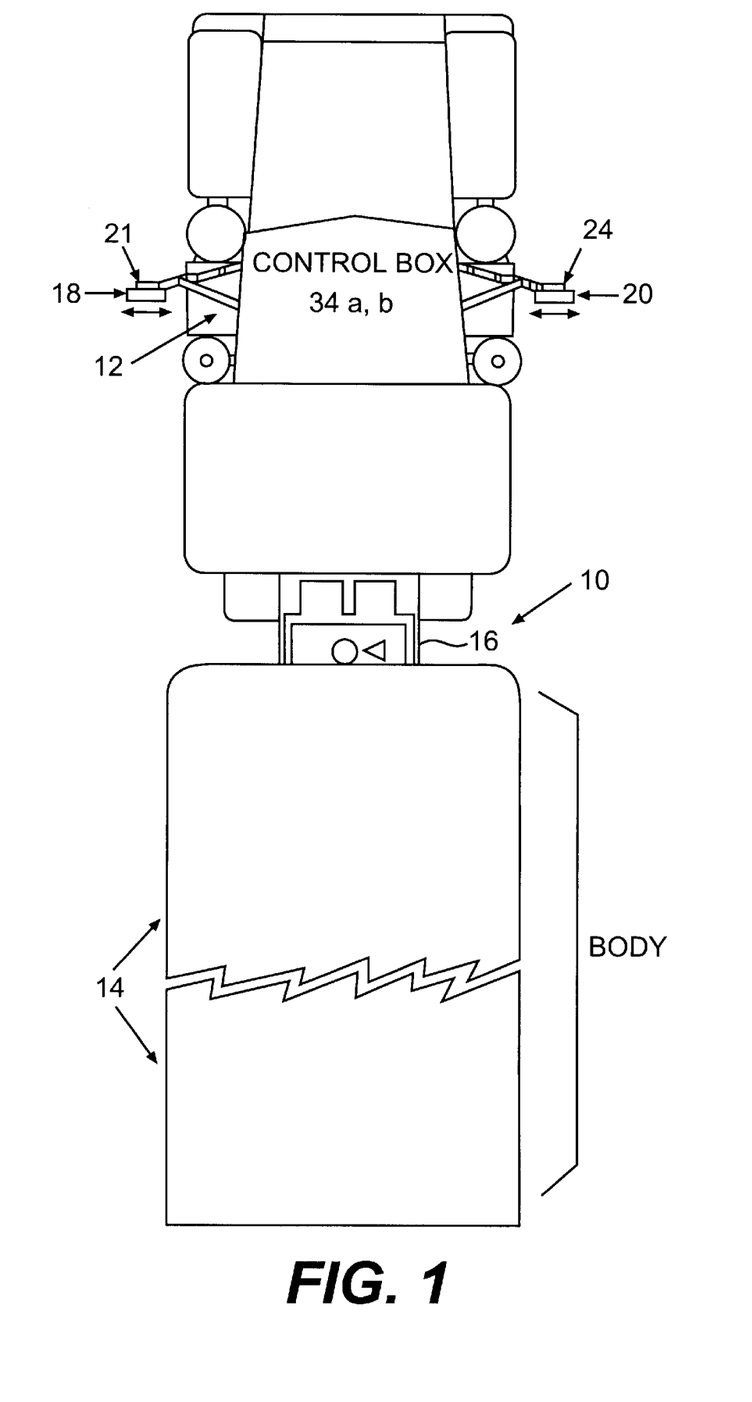
FIG. 1 is a schematic diagram of a truck having rotatable sideview mirrors and a control box and manually operable switches in accordance with the present invention.
Figure 2:
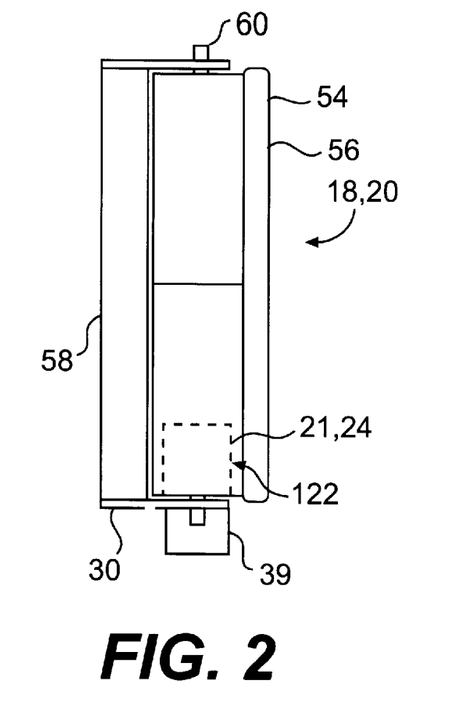
FIG. 2 is a sideview in elevation of a motorized mirror for use in the apparatus and method of the present invention.
Figure 3:
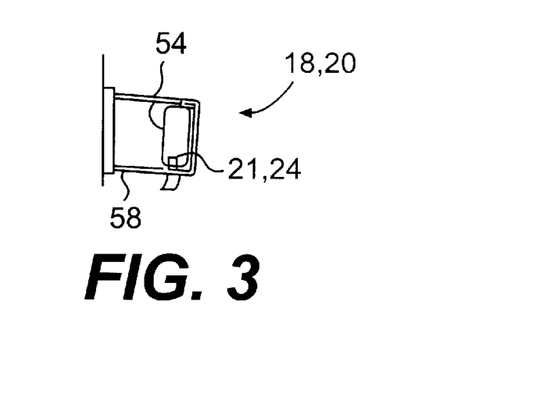
FIG. 3 is a rear view in elevation of the motorized mirror of FIG. 2.
Figure 4:
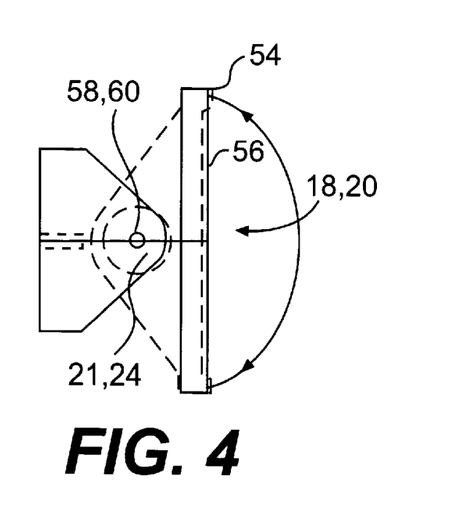
FIG. 4 is a plan view of the motorized mirror of FIGS. 2 and 3.

As herein embodied and referring to FIG. 1, a truck 10 having a driving compartment tractor 12 is coupled to an elongated truck body 14 at an articulated joint 16. A side rearview mirror assembly 18 (referred to at times as a mirror) is rotatably mounted to a left hand side of the tractor 12; and a side rearview mirror assembly 20 (referred to at times as a mirror) is rotatably mounted to a right hand side of the tractor 12.

In accordance with the present invention a motor is coupled to the at least one mirror assembly operative when activated to rotate the respective mirror in opposite directions between a home setpoint position and a scanning setpoint position to permit the operator to view the roadway corresponding to the scanning setpoint position. The scanning setpoint position preferably includes a lane of the roadway outwardly of the adjacent lane.

As broadly embodied in FIGS. 2–5, the motor 21, 24, is a direct current motor positioned within frame 54 of mirror assembly 18, 20. Frame 54 and mirror face 56 are mounted rotatably on mounting bracket 58 and post 60. Motor 21, 24 connects to mirror frame 54 via appropriate mechanical gearing and linkages (not shown), in order to rotate mirror frame 54 and face 56 about post 60 at a sufficient rate of speed. The motor 21, 24 preferably rotates the mirror 18, 20 at a minimum rate of one revolution per minute, and does not require a maximum rate greater than two revolutions per minute. The total travel of the mirror 18, 20 is an arc of between zero and ten degrees as shown, for example in FIG. 7, depending on the distance between the desired home setpoint position and the desired scanning setpoint position. It has been determined that rotation of the mirror 18, 20 slower than one revolution per minute permits the operator to glimpse the area between the home setpoint and scanning setpoint positions during rotation of the mirror, which tends to confuse the operator.

Figure 5:
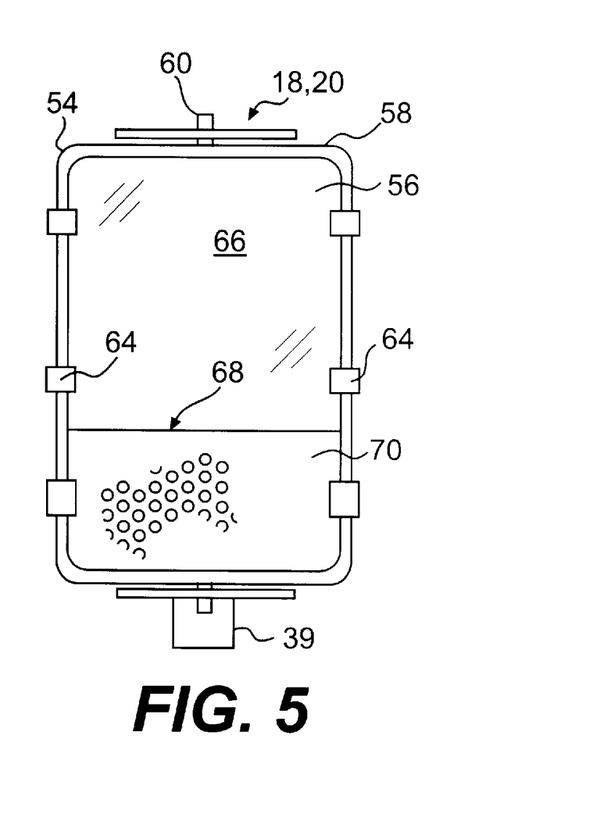
FIG. 5 is a front view in elevation of the mirror of FIGS. 2-4.

The present invention also includes a mirror position tracking device 39 (FIG. 2) which keeps track of the angular position of the mirrors 18, 20. The tracking device 39, which is a potentiometer is described in connection with FIG. 9 and can be mounted either below the mirror assembly 18, 20 or form part of the mirror assembly 18, 20. For certain applications, it may be desirable for mirror 18, 20 to be capable of providing varying optical capabilities as shown in FIG. 5. For this purpose, it is preferred that a plurality of clips 64 be provided in an opening of frame 54, and that a plurality of different mirror faces 56, each having different optical characteristics, e.g., a regular face mirror, a panoramic view mirror, a wide angle mirror, a convex mirror, a spot mirror, or the like, be provided. In addition, selected mirror faces 56 can have multiple optical characteristics. As broadly depicted in FIG. 5, mirror face 56 comprises an upper portion 66, a dividing line 68, and a lower portion 70. Upper portion 66 and lower portion 70 have different optical characteristics. The driver can select the mirror face 56 appropriate for the driving to be done, and easily insert or remove mirror faces 56 by opening and closing clips 64.

Referring again to FIGS. 2–5, the mirrors are mounted to a C-shaped bracket 58 to rotate about a substantially vertical axis extending between the arms of the bracket.

The vertical axis about which the mirror rotates is spaced from the vehicle so the mirror can be rotated outwardly to the scanning setpoint position and inwardly to the home setpoint position. By positioning the mirror 18 or the mirror 20 outwardly at the scanning setpoint position, the operators can increase their view of the road an additional five to ten degrees of mirror movement, or up to one hundred fifty feet from the normal viewing pattern, then automatically return the mirrors 18 and/or 20 to the home setpoint position. The amount of rotation, or in other words the home position setpoint and the scanning setpoint, which in accordance with the present invention may be readily adjusted, is not only a function of the length of the truck, bus, or trailer, but also depends on the width and condition of the roadway and associated traffic pattern. Thus, with the benefit of the present invention, the operator is able to easily adjust the parameters for prevailing conditions. Once the parameters are set the driver need not pay any attention to the length of the path or scan until driving conditions change.

The present invention includes a control box connected to the mirror assembly mounted in the cab 12 in a position that is readily accessible to the driver. The control box may be configured for operating a single side rearview mirror or for operating both a right hand side and left hand side rearview mirror. The control box has a console with controls to accomplish mirror positioning and scanning capabilities. The control box has a home position setpoint knob, a scanning setpoint knob, a turn signal switch, a first motor activation switch, a second switch that activates the motor upon operation of the turn signal, and an audible turn signal warning device.

Figure 6A:
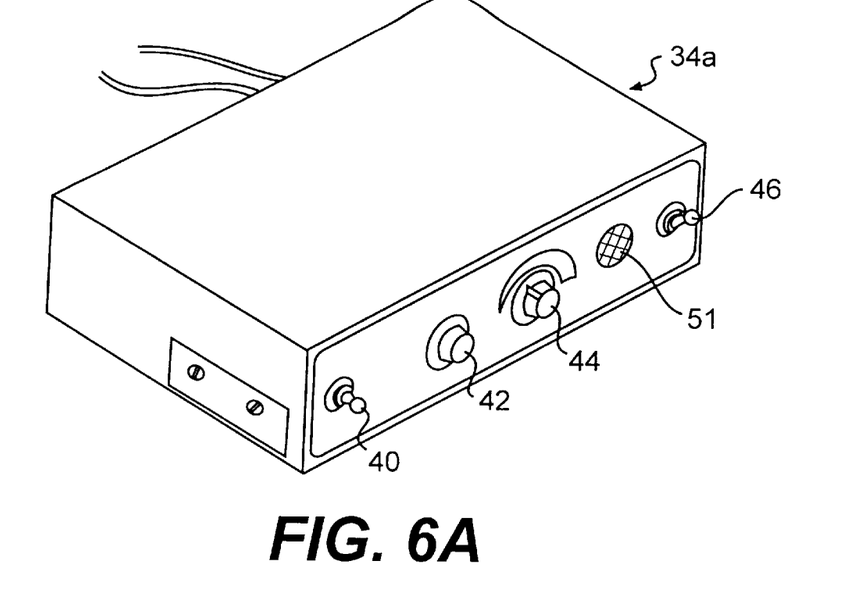
FIG. 6A is a view in perspective of a controller used in the apparatus and method of the present invention.
Figure 6B:
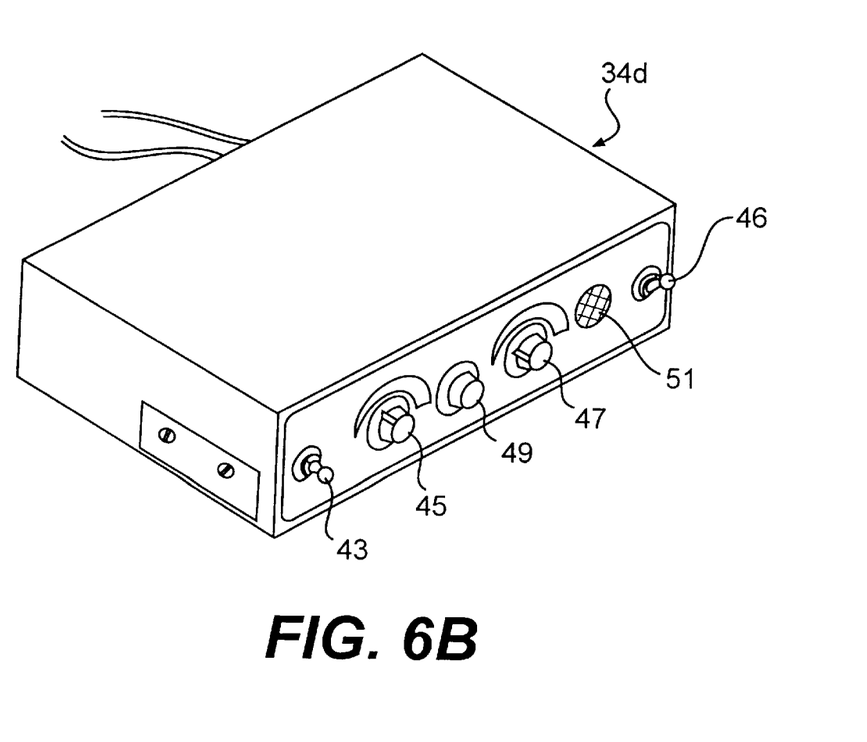
FIG. 6B is a view in perspective of a controller for both a left and a right hand mirror used in the apparatus and method of the present invention.

As herein embodied, and referring to FIG. 6A, a control box 34a is configured to control the right hand rearview mirror assembly 20. A motor activating switch 40 when manually operated against the urging of a spring, for example, to a right hand position, activates the motor 24 to rotate the mirror assembly 20 at the previously described rate outwardly to a scanning setpoint position. The switch 40 may be operated to an upwardly or downwardly position instead of the right and left hand positions. The release of the activating switch 40 to its normal position causes the mirror 20 to return to the home setpoint position at the same rate of rotational speed. A home position setpoint knob 42 can be rotatably positioned toward a left or right hand position for adjusting the home setpoint position of the mirror. A scanning setpoint position knob 44 is rotatably positioned toward a maximum or minimum setpoint position to set the scanning setpoint position of the right hand mirror. For some applications, particularly for overlength vehicles, it may be desirable to be able to control the right hand and left hand mirrors, depending upon which lane the operator desires to occupy. In such event then the control box illustrated in FIG. 6B is used. This control box 34b has a motor activating switch 43, which is manually operable to the right against the urging of a spring, for example, to rotate the right hand mirror 20 to the scanning setpoint position, and manually operable to the left against the urging of a spring for rotating the left hand mirror 18. A knob 45 is rotatable to fix the scanning setpoint of the left hand mirror 18 to the desired position; and a knob 47 is rotatable to set the scanning setpoint of the right hand mirror 20 to the desired position. A knob 49 is rotatable to set the desired home position setpoint for both the right and the left hand mirror 18 and 20. The knob 49 has inner and outer rings. The turning of the outer ring sets the desired home setpoint position for the left hand mirror, and the turning of the inner ring sets the desired home setpoint position for the right hand mirror. For example, a switch 46 when "on" activates the motor upon the operation of the turn signal. This is particularly useful when the truck is being operated in a city environment. An audible warning device 51 is operative to beep at ten second intervals, for example, after the turn signal has been operating for a period of time.

In accordance with the invention, the motor activation switch activates the motor through a motor controller responsive to the operation of the activation switch to one position for rotating the mirror from the home setpoint position to the scanning setpoint position, and is responsive to the operation of the switch to a second position for rotating the mirror from the scanning setpoint position to the home setpoint position.

The motor 21, 24 is operated to scan the mirror both to its scanning setpoint position and its home setpoint position by a closed loop analog proportional-integral-differential (hereinafter PID) controller. In accordance with the invention, the controller includes a desired scanning setpoint position potentiometer, a lane scan setpoint potentiometer, a mirror position tracking potentiometer, a PID filter, a summing junction, a motor driver, and reference voltage sources.

Figure 9:
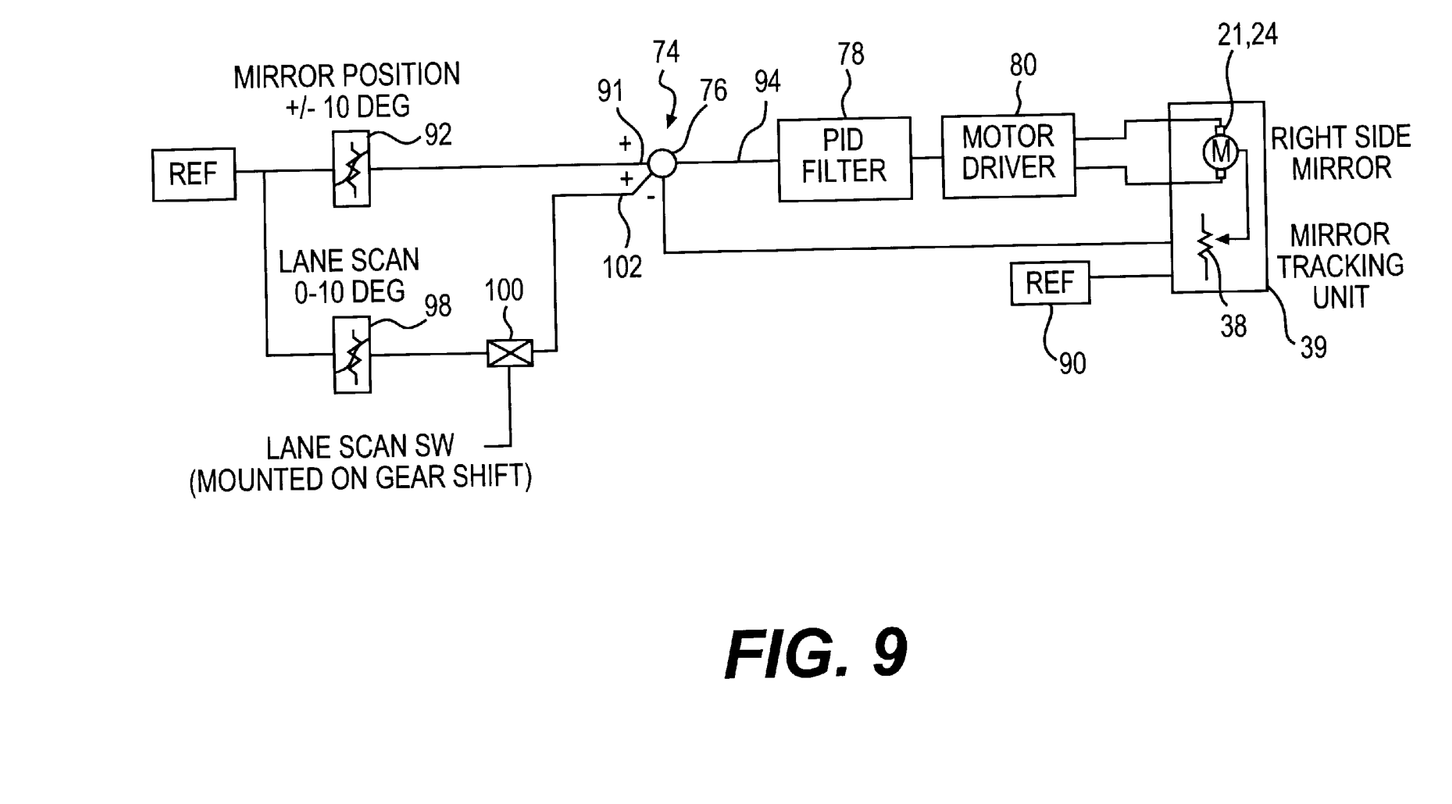
FIG. 9 is a schematic diagram of a circuit used in operating any one of the mirrors between a set home position and a scanning setpoint position.

As herein embodied, and referring to FIG. 9, the control box 34A, 34B comprises a circuit 74 that includes a summing junction 76, a PID filter 78, and a motor driver 80, for the motor 21, 24, a mirror tracking potentiometer 38, a desired mirror position potentiometer 92, and a lane scan potentiometer 98. The mirror is driven by a DC gear motor coupled to a first potentiometer 38 of the tracking unit 39, which is rotated by the mirror 18, 20. The potentiometer 38 generates a DC voltage from a reference voltage 90 that is proportional to the actual position of the mirror 18, 20. The position of the mirror 18, 20 is controlled by setting a DC voltage at a first non-inverting input 91 to the summing junction 76. This voltage is generated by the second potentiometer 92 which corresponds to the desired home setpoint position. The voltage representing the actual mirror position from the potentiometer 38 is subtracted from the voltage corresponding to the desired mirror position to generate an error signal on line 94. The error signal on line 94 is amplified by the PID filter 78 and drives the mirror in the direction that causes the error signal to approach zero. When the error signal is zero, the motor stops running and the desired position of the mirror 18, 20 matches the actual position.

The voltage which causes the motor 21, 24, to drive the respective mirror to the scanning position setpoint is determined by a third potentiometer 98. An analog switch 100 connects the lane scan voltage to a second non-inverting input 102 to the summing junction 76 which causes the motor 21, 24 to drive the mirror 18, 20 to a new position represented by the sum of the voltage from the second potentiometer 92 and the voltage from the third potentiometer 98. Upon release of the switch 100 the motor 21, 24 returns to the position represented by the potentiometer 92. Thus, the mirror 18, 20 practically snaps to the position set by the third potentiometer 98 and snaps back to its original or home setpoint position as determined by the potentiometer 92. Only one closure of the switch causes the mirror to rotate in both directions.

Figure 7:
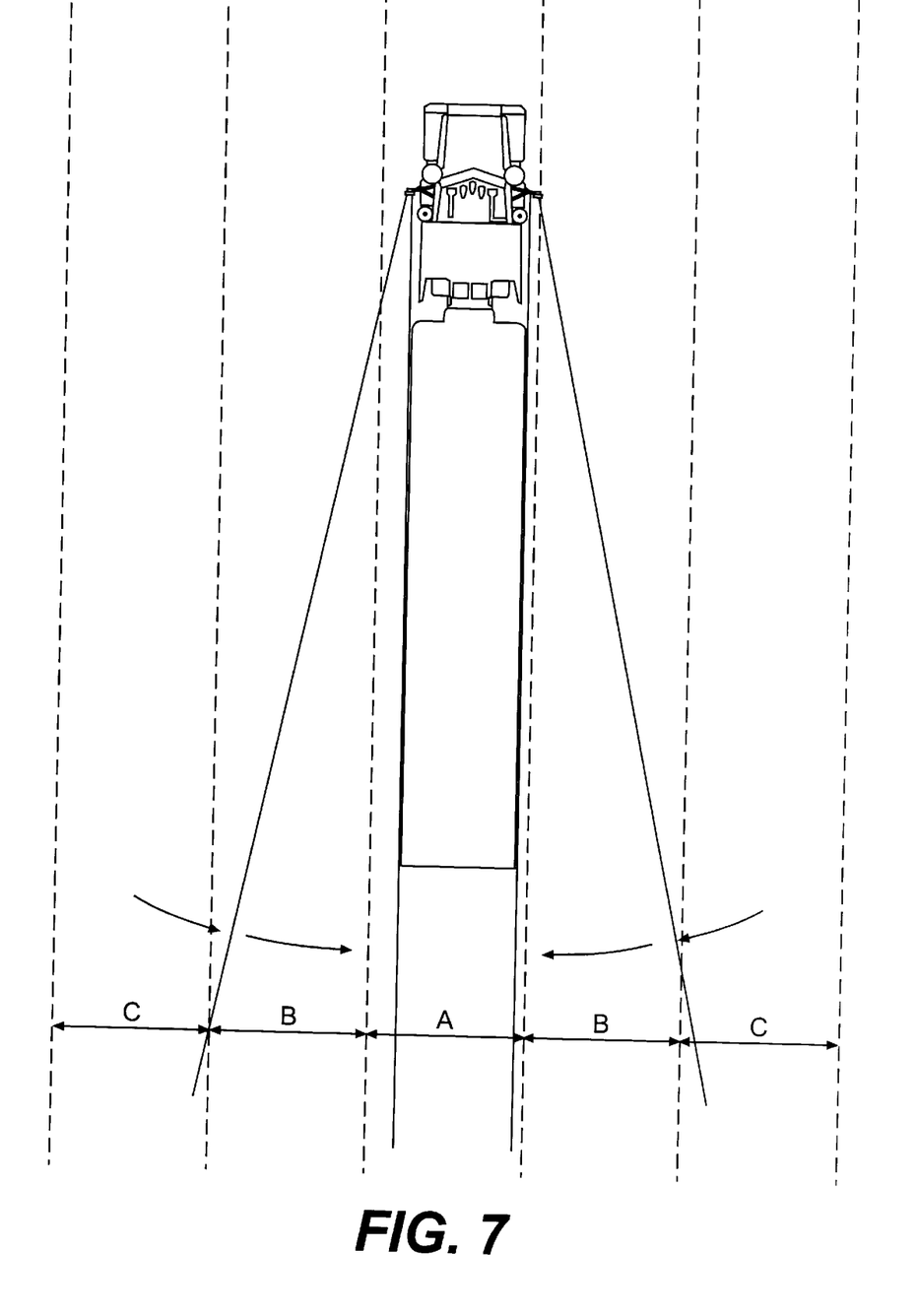
FIG. 7 is a schematic plan view illustrating a set home field of view of left and right hand sideview mirrors of a truck traveling on a five lane highway.
Figure 8:
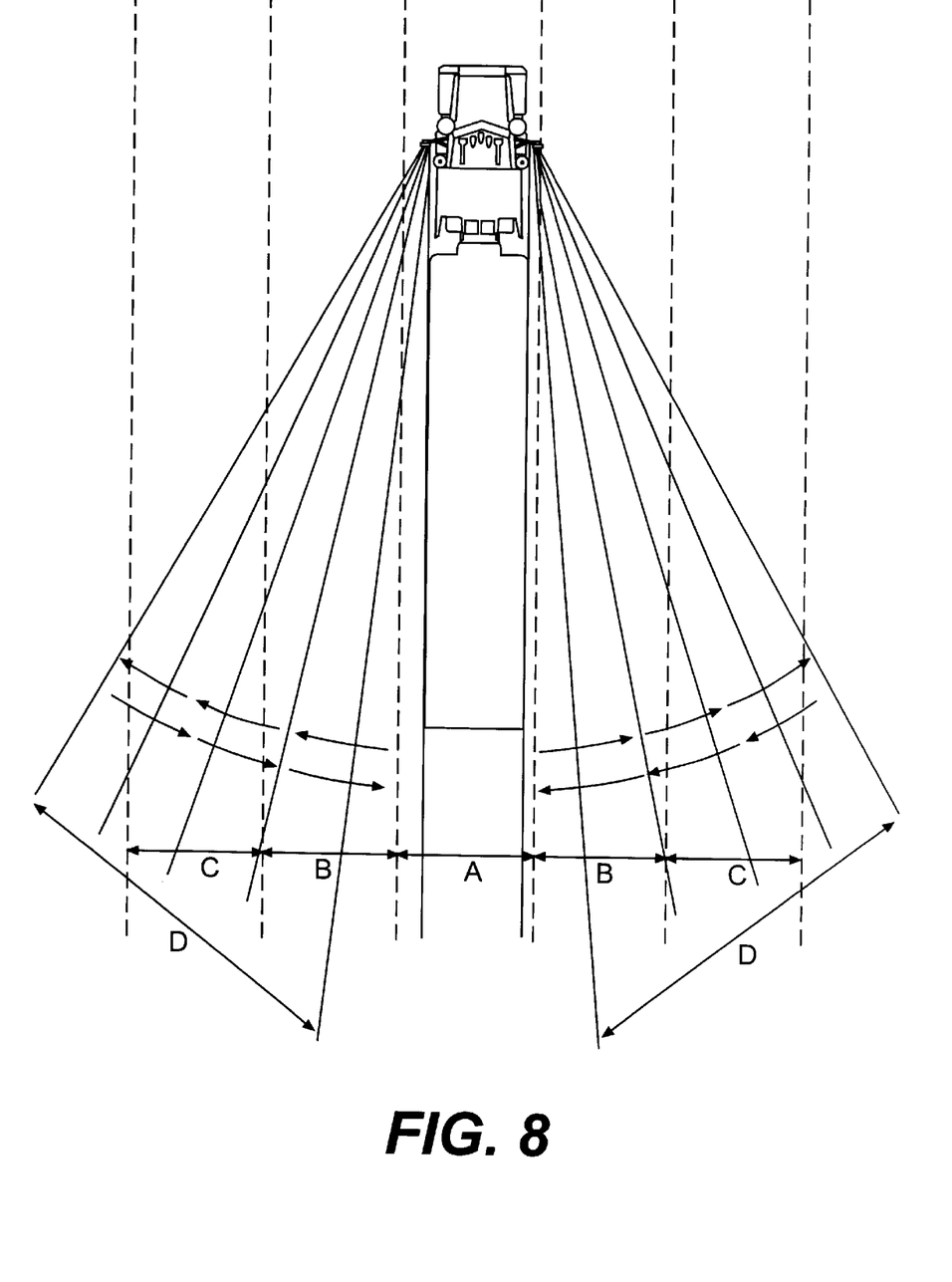
FIG. 8 is a schematic plan view illustrating a typical scanning setpoint field of view of left and right hand sideview mirrors of a truck traveling on a five lane highway.

In operation, and referring to FIGS. 7 and 8, when the driver wishes to change lanes, he or she moves the motor activation switch 40 to a first position. Almost instantaneously, (approximately ¾ ths of a second ) the mirror 18, 20 is rotated to the scanning setpoint position at a rate of speed sufficient to render transparent any view intermediate the home setpoint and the outer or scanned setpoint position of the mirror and permit the operator to view a lane of the roadway outwardly spaced from the adjacent lane. By holding the switch in the first position the mirror is held in the outer position while the driver determines that all is clear. After determining the safety of the lane change, the driver releases the switch 40 and the mirror returns to the home setpoint position. While the driver is travelling in lane A, the view seen by the driver when the mirror 18, 20 is in the home setpoint position is area B. When the mirror is rotated to the scanning setpoint position, the view seen by the driver is area C. The speed of rotation of the mirror 18, 20 is such that the area D between the areas B and C during rotation of the mirror is not seen by the driver.

It will be apparent to those skilled in the art that various modifications and variations can be made in the apparatus and method of the present invention without departing from the spirit or scope of the invention. For example hard wired circuitry is illustrated and described for controlling the motor. However, it is contemplated that the mirrors could be controlled by a central processing unit and software. Thus, it is intended that the present invention cover the modifications and variations of this invention provided they come within the scope of the appended claims and their equivalents.

What is claimed is:

1. A rear view mirror apparatus for viewing an area of a multilane roadway alongside a motor vehicle having an elongated body, comprising:

at least one mirror rotatably mounted to one side of a driver compartment of the vehicle,
said at least one mirror being normally oriented in a home position to permit an operator to view a section of roadway including at least a portion of a lane adjacent the lane in which the vehicle is traveling;

a motor coupled to the at least one mirror operative when activated to rotate the mirror in opposite directions;

a motor activation switch manually operable to a first condition when in a second condition, and operable to the second condition when in the first condition; and a controller responsive to the operation of the activation switch to the first condition for rotating the mirror in a first direction through a path starting from the home position to a scanning setpoint position to view the roadway including a lane of the roadway outwardly of the adjacent lane, and responsive to the operation of the switch to the second condition following the manual operation to the first condition to rotate the mirror in a second direction from the scanning setpoint position to the home setpoint position; and means for setting the scanning setpoint position wherein the setpoint position is preselected by the operator from within a range of positions, and set in the controller.

2. The apparatus of claim 1 wherein the controller includes circuitry for controlling the mirror to rotate through an arc of between zero to ten degrees relative to the axis of the truck body.

3. The apparatus of claim 1 wherein the controller comprises a manually operable home position knob operable to adjustably set the home position of the mirror.

4. The apparatus of claim 1 wherein the controller comprises the means for setting the setpoint position which includes a manually operable scanning position setpoint knob for adjustably setting the scanning setpoint position of the mirror.

5. The apparatus of claim 2 wherein the controller comprises the means for setting the setpoint position which includes a manually operable scanning setpoint position knob for adjustably setting the scanning setpoint position of the mirror.

6. The apparatus of claim 1 wherein the activation switch comprises a manually operable switch that is normally in the second condition.

7. The apparatus of claim 6 wherein the activation switch is operable to cause the motor to rotate the mirror to the home position upon release thereof when the mirror is in the scanning setpoint position.

8. The apparatus of claim 1 wherein the activation switch is located on a turn signal lever in the driver compartment for operating said switch to said first condition.

9. The apparatus of claim 1 wherein the activation switch is located on a gear shift lever in the driver compartment for operating said switch to said first condition.

10. The apparatus of claim 1 wherein the at least one mirror comprises a pair of mirrors, each mirror of said pair being mounted on left and right sides of the vehicle, respectively, and the controller activates the respective motors to rotate the mirror on the right side of the motor vehicle counterclockwise and the mirror on the left side of the motor vehicle clockwise in response to the operation of the activation switch to said first condition.

11. The apparatus of claim 8 wherein the activation switch is operated in one direction to said one condition and a second direction to said second condition.

12. The apparatus of claim 8 wherein the controller comprises a home position knob having an inner and outer ring, the outer ring being used for determining the home position of the mirror mounted on one side of the vehicle, and the inner ring being used for determining a home position of another mirror mounted on another side of the vehicle.

13. The apparatus of claim 1 wherein the controller includes a circuit responsive to the operation of the activation switch to the first condition for rotating the mirror in a first direction through a path starting from the home position to the scanning setpoint position, to permit the operator, prior to changing lanes, to view the roadway including a lane of the roadway outwardly of the adjacent lane, and responsive to the operation of the switch to the second condition following the manual operation to the first condition to rotate the mirror in the second direction from the scanning setpoint position to the home position.

14. The apparatus of claim 1 wherein the controller comprises a proportional-integral-differential circuit having a summing junction coupled to a reference voltage source, a first adjustable voltage source corresponding to a desired home position of the mirror, a second adjustable voltage source corresponding to a desired scanning setpoint position of the mirror, and a third voltage source corresponding to the sum of said first and second voltage sources connected to rotate the mirror to the desired scanning setpoint position.

15. The apparatus of claim 10 wherein the controller comprises a home position knob having an inner and outer ring, the outer ring being used for determining the home position of the mirror mounted on one side of the vehicle, and the inner ring being used for determining a home position of another mirror mounted on another side of the vehicle.

16. A method of determining obstacles not visible to an operator of an elongated vehicle when anticipating changing traffic lanes, comprising:

positioning a motor-operated side rear view mirror mounted to a driver compartment of the vehicle to a home position setpoint for viewing an adjacent lane of traffic when the motor is inactive;

selecting a scanning position setpoint from within a range of rotational positions and setting the scanning position setpoint into a controller;

operating a switch, electrically connected to the controller, to a first condition to activate the motor in anticipation of changing lanes;

automatically positioning the mirror to the selected scanning position setpoint for viewing a lane of traffic outwardly from the adjacent lane of traffic upon activation of the motor in response to operation of said switch to said first position;

holding the switch in the first position while viewing the lane corresponding to the scanning position setpoint;

releasing the hold on the switch to reactivate the motor; and automatically rotating the mirror to the home position setpoint upon reactivation of the motor for viewing the adjacent lane of traffic.

17. The method of claim 16 where the step of positioning the mirror to a scanning position setpoint comprises rotating the mirror at a rate in the range of one to two revolutions per minute.

18. The method of claim 16 wherein the step of positioning the mirror comprises rotating the mirror through an arc of approximately + or − ten degrees.

19. The method of claim 16 wherein the step of operating the switch comprises moving the switch horizontally against the urging of a spring.

20. The method of claim 16 wherein the step of operating the switch comprises moving the switch vertically against the urging of a spring.

21. A rear view mirror apparatus for viewing an area of a multilane roadway alongside a motor vehicle having an elongated body, comprising:

at least one mirror rotatably mounted to one side of a driver compartment of the vehicle,
said at least one mirror being normally oriented in a home position to permit an operator to view a section of roadway including at least a portion of a lane adjacent the lane in which the vehicle is traveling;

a motor coupled to the at least one mirror operative when activated to rotate the mirror in opposite directions;

a motor activation switch manually operable to a first condition when in a second condition, and operable to the second condition when in the first condition;

a controller responsive to the operation of the activation switch to the first condition for rotating the mirror in a first direction through a path starting from the home position to a scanning setpoint position to view the roadway including a lane of the roadway outwardly of the adjacent lane, and responsive to the operation of the switch to the second condition following the manual operation to the first condition to rotate the mirror in a second direction from the scanning setpoint position to the home setpoint position;

means for setting the scanning setpoint position wherein the setpoint position is preselected by the operator from within a range of positions, and set in the controller; and a mirror position tracking device attached to the at least one mirror for tracking an angular position of the mirror during its rotation.

22. The apparatus of claim 21, wherein the mirror position tracking device includes a potentiometer.

23. A method of determining obstacles not visible to an operator of an elongated vehicle when anticipating changing traffic lanes, comprising:

positioning a motor-operator side rear view mirror mounted to a driving compartment of the vehicle to a home position setpoint for viewing an adjacent lane of traffic when the motor is inactive;

selecting a scanning position setpoint from within a range of rotational positions and setting the scanning position setpoint into a controller;

operating a switch to a first condition to activate the motor in anticipation of changing lanes;

positioning the mirror to the scanning position setpoint for viewing a lane of traffic outwardly from the adjacent lane of traffic upon activation of the motor in response to operation of said switch to said first position;

holding the switch in the first position while viewing the lane corresponding to the scanning position setpoint;

releasing the hold on the switch to reactivate the motor;

rotating the mirror to the home position setpoint upon reactivation of the motor for viewing the adjacent lane of traffic; and tracking an angular position of the mirror during its rotation with a mirror position tracking device.

\* \* \* \* \*